Dec. 10, 1929.　　　F. KUHN ET AL　　　1,738,908
ELECTRIC MELTING POT
Filed Feb. 13, 1928　　　2 Sheets-Sheet 1
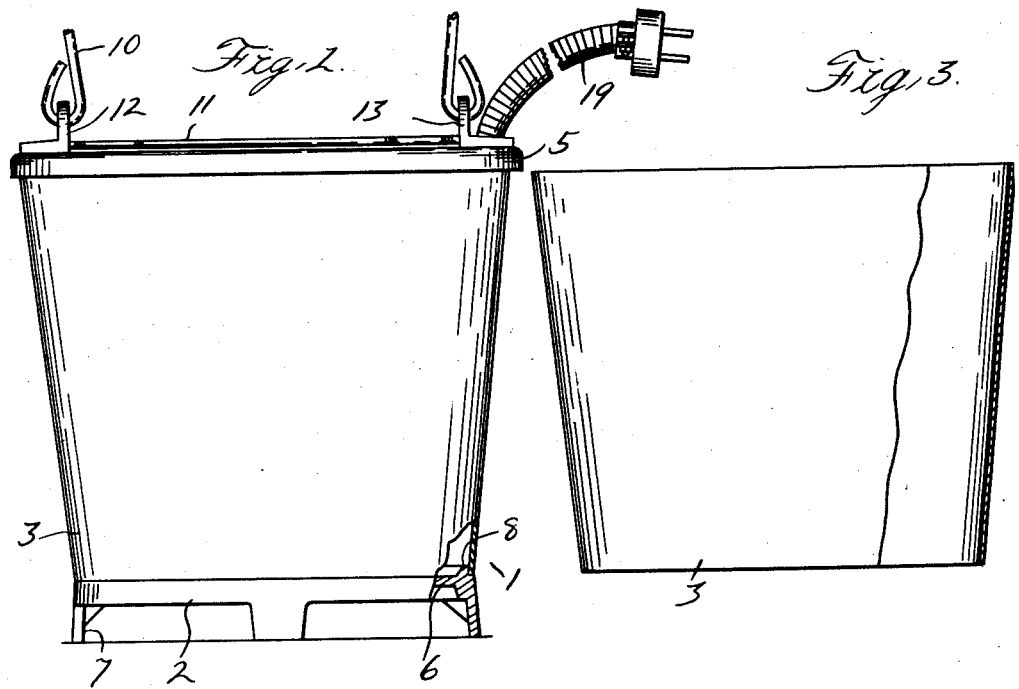
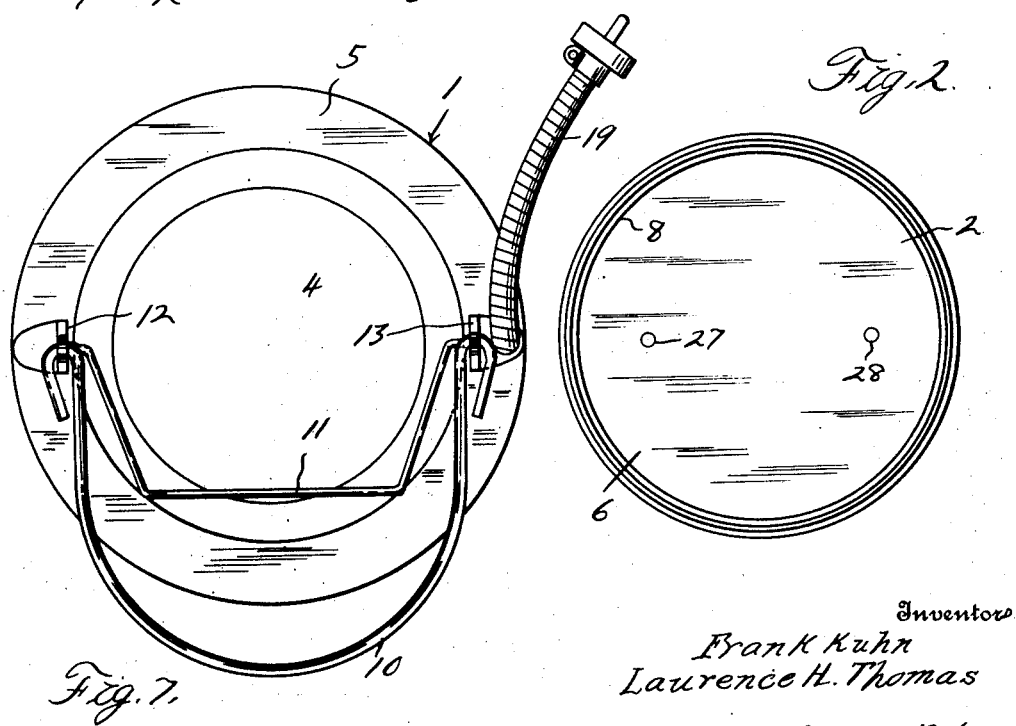
Inventors
Frank Kuhn
Laurence H. Thomas

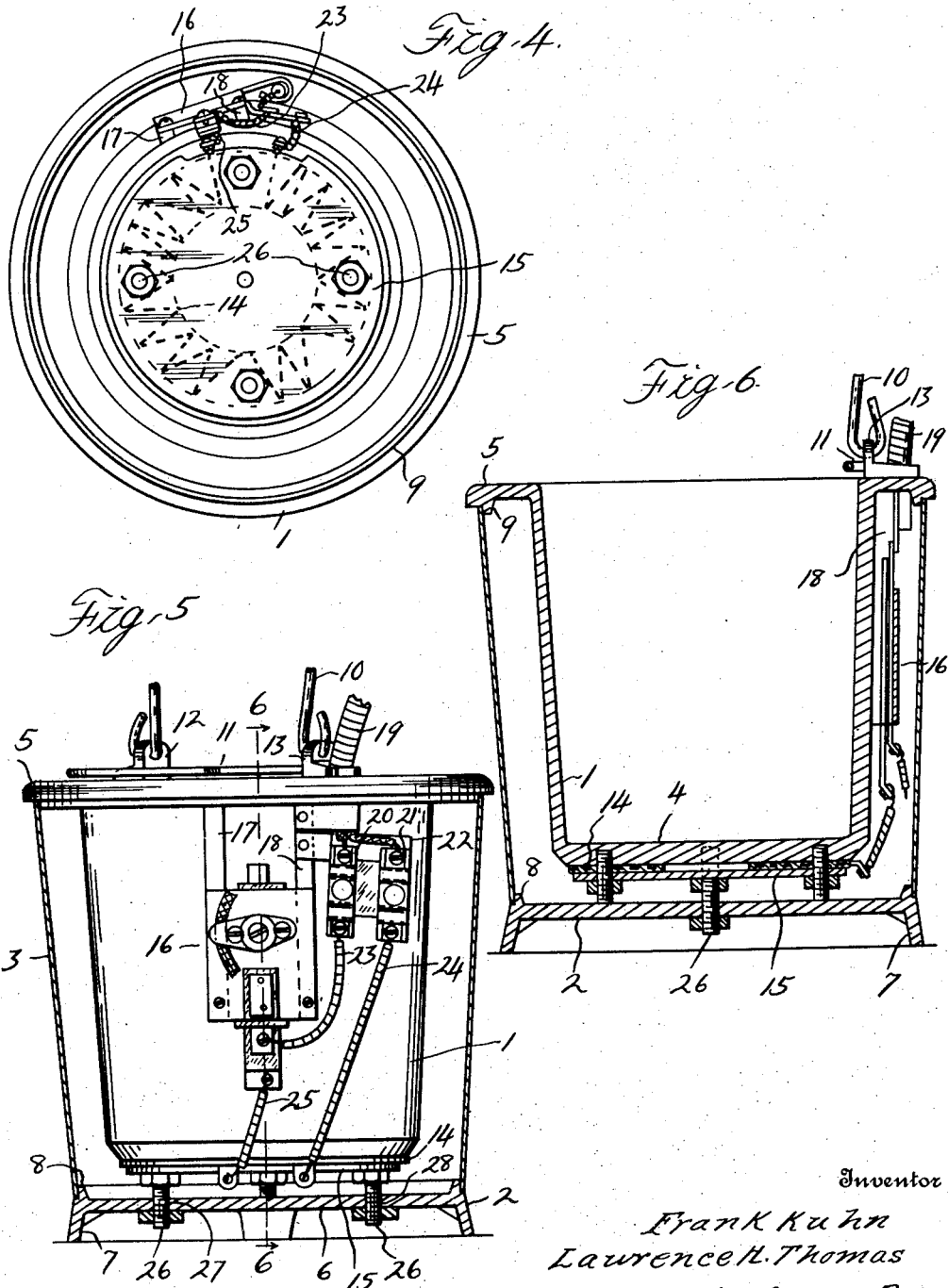

Patented Dec. 10, 1929

1,738,908

UNITED STATES PATENT OFFICE

FRANK KUHN AND LAURENCE H. THOMAS, OF DETROIT, MICHIGAN, ASSIGNORS TO AMERICAN ELECTRICAL HEATER COMPANY, OF DETROIT, MICHIGAN, A CORPORATION OF MICHIGAN

ELECTRIC MELTING POT

Application filed February 13, 1928. Serial No. 254,103.

This invention relates generally to electrically heated receptacles, such as glue pots and the like, and consists of certain novel features of construction, combinations and arrangements of parts as will be hereinafter more fully described and particularly pointed out in the appended claims.

In the accompanying drawings:—

Figure 1 is a side elevation of an apparatus, embodying our invention;

Figure 2 is a detail view of the stand;

Figure 3 is a detail view of the shell;

Figure 4 is a bottom plan view of the melting pot;

Figure 5 is a side elevation of the melting pot;

Figure 6 is a sectional view taken on the line 6—6 of Figure 5.

Figure 7 is a top plan view of the melting pot.

Referring now to the drawings, 1 is a pot, preferably of aluminum, in which glue or other materials may be melted, 2 is a supporting stand therefor, and 3 is an outer shell or casing. As shown, the pot 1 has a substantially flat bottom 4 and is provided at its upper open end with a laterally projecting peripheral flange 5. The stand 2 is preferably a casting and comprises a substantially flat base 6 and a plurality of depending legs 7. The shell 3 is frusto-conical in shape and extends between the base 6 and the lateral flange 5 of the pot when the parts are assembled. Preferably the base 6 of the stand and the lateral flange 5 of the pot have annular flanges 8 and 9, respectively, that serve as centering or positioning means for the shell to insure proper assembly of the parts. Two bails 10 and 11, respectively, are secured to suitable fittings 12 and 13 on the flange 5, one of said bails being preferably larger than the other and serving as a handle to enable the pot to be readily moved about, while the other constitutes a rest for a suitable glue brush or the like. When not in use each bail may be swung to one side, as shown in Figure 7, thus they will not be in the way while the pot is in use or is being cleaned.

In the present instance an electrical heating unit, such as a spirally wound metal ribbon 14, is clamped by pressure plate 15 against the bottom 4 of the pot and is automatically rendered operative or inoperative for heating the pot by means of a suitable thermostat 16 that in turn is located at one side of the pot, preferably between two spaced longitudinally extending ribs 17 and 18 of the pot at a point approximately midway between the lateral flange 5 and the bottom of the pot. Thus, a relatively large area of the pot is heated by the unit 14 and the thermostat 16 is located inside the shell 3 between the latter and a side of the pot where it is responsive to glue temperatures and controls the temperature of the aluminum pot. As a result the temperature of the glue and of the pot may be accurately and automatically maintained within certain limits. This insures against overheating the material in the pot. For example glue boils at 150 degrees F. and spoils if heated to 210 degrees F. Any suitable wiring system may be used with the heating unit 14 and thermostat 16, but for convenience of assembly and economy a suitable armoured cable 19 extends through one of the fittings 12 and through the flange 4 and terminates just below the latter. The wires of this cable project below the lower end of the armor thereof and are connected to suitable spaced terminal plates 20 and 21, respectively, that in turn are anchored on a bracket 22 projecting from the rib 17 of the pot adjacent to the thermostat. Short insulating wires 23 and 24, respectively, lead from these terminal plates 20 and 21 to one end of the spirally wound metal ribbon constituting the heating unit 14 and to one contact arm of the thermostat 16, while another wire 25 connects the opposite end of the ribbon 14 with another contact arm of the thermostat 16. Thus the electrical parts, with the exception of the armoured cable 19, are concealed by the outer shell 3 when the parts are assembled. Moreover, when the parts are assembled two of the bolts 26 used to clamp the pressure plate 15 against the heating unit project below the other two bolts and extend through two circular openings 27 and 28 in the base 6 of the stand and thereby prevent any turning movement of the pot relative to the shell 3 and stand 2 when, for instance, the glue or other material in the pot is being stirred or moved when the pot is in use.

While it is believed that from the foregoing description, the nature and advantage of our invention will be readily apparent, we desire to have it understood that we do not limit ourselves to what is herein shown and described and that such changes may be resorted to when desired as fall within the scope of what is claimed.

What we claim as our invention is:

1. In combination, a support, a receptacle in which glue and the like may be heated on said support, a heating element on the bottom of said receptacle, and means on an upright side of said receptacle at a point substantially midway the top and bottom thereof for controlling the operativeness of said heating element, the receptacle, element and means being assembled together and movable as a unit relative to said support.

2. In combination, a support, a receptacle in which glue and the like may be heated on said support, an electrical heating element on the bottom of said receptacle, and a thermostat in circuit with said element and located on an upright side of said receptacle at a point substantially midway the top and bottom thereof so as to be responsive to temperatures of the material such as glue in the receptacle to control automatically the action of said heating element, the receptacle, thermostat and element being assembled and movable as a unit relative to the support.

3. In combination, a stand having a base, a shell rising from the base, a melting pot above the base and within the shell, means for heating said pot including a unit between said base and pot, and means for regulating said heating means including a thermostat between upright side walls of said shell and pot operatively associated with said heating unit, said pot, heating unit and regulating means being assembled and movable as a unit relative to said stand and shell.

4. In combination, a melting pot, a plurality of bails, one of said bails constituting a handle and the other of said bails serving as a rest or support for a brush, and a common mounting for said bails secured to said pot.

5. In combination, a receptacle in which glue and the like may be heated, an electrical heating element, a pressure plate therefor, and means for securing said plate and element to said receptacle including bolts of various lengths projecting from said element, the shorter of said bolts constituting supporting legs for said receptacle and the longer of said bolts being adapted to extend through a support such as the base of a stand and the like.

6. A portable unit comprising a receptacle in which glue and the like may be heated, a pressure plate secured to the bottom of said receptacle, an electrical heating element between said plate and bottom, and a thermostat secured to one side of said receptacle at a point substantially midway between a top and bottom thereof and electrically connected to and adapted to control the action of said electrical heating element.

7. In combination, a receptacle in which glue and the like may be heated, having spaced longitudinally extending ribs on one side thereof, a pressure plate on the bottom of said receptacle, and electrical heating element between said plate and the bottom of said element, and a thermostat between the ribs aforesaid electrically connected to and adapted to control the action of said electrical heating element.

8. In combination, a melting pot, fittings secured thereto at one end thereof, and means terminally connected to said fittings and including a bail for supporting a brush.

In testimony whereof we affix our signatures.

FRANK KUHN.
LAURENCE H. THOMAS.